(12) United States Patent
Winterberg et al.

(10) Patent No.: US 11,326,027 B2
(45) Date of Patent: May 10, 2022

(54) PROCESS FOR THE PREPARATION OF HYDROXYL-FUNCTIONALIZED POLYSILOXANES

(71) Applicant: Henkel AG & Co. KGaA, Duesseldorf (DE)

(72) Inventors: Marleen Winterberg, Rostock (DE); Marta Woznicka, Rostock (DE); Annika Dietrich, Rostock (DE); Esteban Mejia, Rostock (DE); Udo Kragl, Kritzmow (DE); Christina Despotopoulou, Minneapolis, MN (US); Ralf Dunekake, Duesseldorf (DE); David Briers, Hasselt (DE); Johann Klein, Duesseldorf (DE); Henrik Lund, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/441,451

(22) Filed: Jun. 14, 2019

(65) Prior Publication Data
US 2019/0322808 A1    Oct. 24, 2019

Related U.S. Application Data

(63) Continuation of application No. PCT/EP2017/082322, filed on Dec. 12, 2017.

(30) Foreign Application Priority Data

Dec. 16, 2016   (EP) ..................................... 16204752

(51) Int. Cl.
```
C08G 77/46      (2006.01)
C08G 77/16      (2006.01)
C07F 7/08       (2006.01)
C08G 77/08      (2006.01)
C08G 77/388     (2006.01)
```
(Continued)

(52) U.S. Cl.
CPC ............ C08G 77/46 (2013.01); C07F 7/0879 (2013.01); C08G 77/08 (2013.01); C08G 77/14 (2013.01);
(Continued)

(58) Field of Classification Search
CPC ....... C08L 83/12; C09D 183/12; C08G 77/46; C08G 77/34
(Continued)

(56) References Cited

U.S. PATENT DOCUMENTS 3,268,561 A   8/1966 Peppel et al.
3,622,609 A   11/1971 Mironov et al.
(Continued)

FOREIGN PATENT DOCUMENTS

CN   101381462 A  *  3/2009
CN   102504260 A     6/2012
(Continued)

OTHER PUBLICATIONS

International Search Report for International PCT Patent Application No. PCT/EP2017/082322 dated Feb. 22, 2018.
(Continued)

*Primary Examiner* — Marc S Zimmer
(74) *Attorney, Agent, or Firm* — James E. Piotrowski

(57) ABSTRACT

A method for producing a hydroxyl-functionalized polysiloxane having secondary or tertiary hydroxyl groups, said method comprising the steps of:

i) reacting a hydroxyalkyl allyl ether having a secondary or tertiary alcohol group with a siloxane under anhydrous conditions and under transition metal catalysis, said hydroxylalkyl allyl ether conforming to Formula (I)

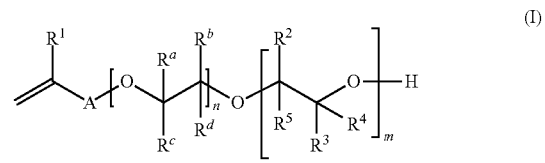

wherein n is 0, 1, 2, 3, 4 or 5, preferably 0; m is 1, 2, 3, 4 or 5, preferably 1; spacer group A is constituted by a covalent bond or a $C_1$-$C_{20}$ alkylene group; $R^1$ is hydrogen, a $C_1$-$C_8$ alkyl group, a $C_3$-$C_{10}$ cycloalkyl group, a $C_6$-$C_{18}$ aryl group or an aralkyl group; $R^a$, $R^b$, $R^c$, $R^d$, $R^2$, $R^3$, $R^4$ and $R^5$ may be the same or different and each is independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen; and said siloxane conforming to Formula (II)

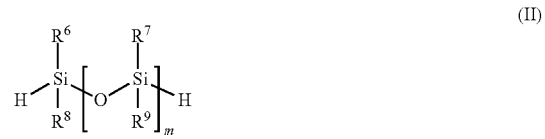

wherein m is 1, 2, 3, 4 or 5, preferably 1; $R^6$, $R^7$, $R^8$ and $R^9$ may be the same or different and each represent a $C_1$-$C_8$ alkyl group, a $C_3$-$C_{10}$ cycloalkyl group, a $C_6$-$C_{18}$ aryl group or a $C_6$-$C_{18}$ aralkyl group; and ii) in the presence of the reaction product of step i), performing a ring opening polymerization of at least one cyclic siloxane monomer.

13 Claims, 1 Drawing Sheet

(51) Int. Cl.
*C08G 77/14* (2006.01)
*C08G 65/336* (2006.01)

(52) U.S. Cl.
CPC ........... *C08G 77/16* (2013.01); *C08G 77/388* (2013.01); *C08G 65/336* (2013.01)

(58) Field of Classification Search
USPC .................................................... 528/29, 31
See application file for complete search history.

(56) References Cited

U.S. PATENT DOCUMENTS

| | | | | |
|---|---|---|---|---|
| 4,242,466 | A | * | 12/1980 | Schilling, Jr .......... C08G 77/46 521/112 |
| 4,618,703 | A | | 10/1986 | Thanawalla et al. |
| 4,689,383 | A | | 8/1987 | Riffle et al. |
| 4,746,683 | A | * | 5/1988 | Kilgour ................. C08J 9/0061 521/112 |
| 9,073,836 | B2 | | 7/2015 | Klumpe et al. |
| 2006/0155051 | A1 | | 7/2006 | Herzig |
| 2007/0036962 | A1 | * | 2/2007 | Sasaki .................... B82Y 20/00 428/292.1 |
| 2011/0098400 | A1 | * | 4/2011 | Blanc-Magnard ...... C08L 83/00 524/500 |
| 2015/0322211 | A1 | * | 11/2015 | Akiyama ............. H01L 23/296 528/15 |
| 2019/0225806 | A1 | * | 7/2019 | Muramatsu .......... C09D 183/06 |

FOREIGN PATENT DOCUMENTS

| | | |
|---|---|---|
| CN | 103183803 A | 7/2013 |
| CN | 103897194 A | 7/2014 |
| EP | 0520426 A1 | 12/1992 |
| EP | 2610281 A | 7/2013 |
| RU | 2463316 C2 | 10/2012 |
| RU | 2567432 C1 | 11/2015 |
| SU | 1162826 A1 | 6/1985 |

OTHER PUBLICATIONS

DIN 55672-1:2007-08.
Lebedev, B.V. et al. Thermodynamics of Poly(dimethyldisiloxane) in the Range of 0-350 K. Vysokomol. Soed. Ser. A (1978), 20, pp. 1297-1303.
Duda, A. et al. Thermodynamics and Kinetics of Tring-Opening Polymerization in Handbook of Ring-Opening Polymerization, Wiley-VCH, Weinheim, Germany, (2009) p. 8.
Ackermann, J. et al. Chemie und Technologie der Silikone II. Herstellung und Verwendung von Siliconpolymeren, Chemie in unserer Zeit (1989), 23, pp. 86-99.
Choknowski, J. et al. Cationic Polymerization of Siloxanes Die Macromolekulare Chemie 175, pp. 3299-3303 (1974).
Choijnowski, J. et al. Kinetically controlled ring-opening polymerization, J. Inorg. Organomet. Polym. (1991) 1, pp. 299-323.
Nuyken et al. Ring-Opening Polymerization—An Introductory Review Polymers 2013, 5, 361-403.
J. Am. Chem. Soc. 71 (1949) 1152.
ISO 868.
DIN 53504.

* cited by examiner

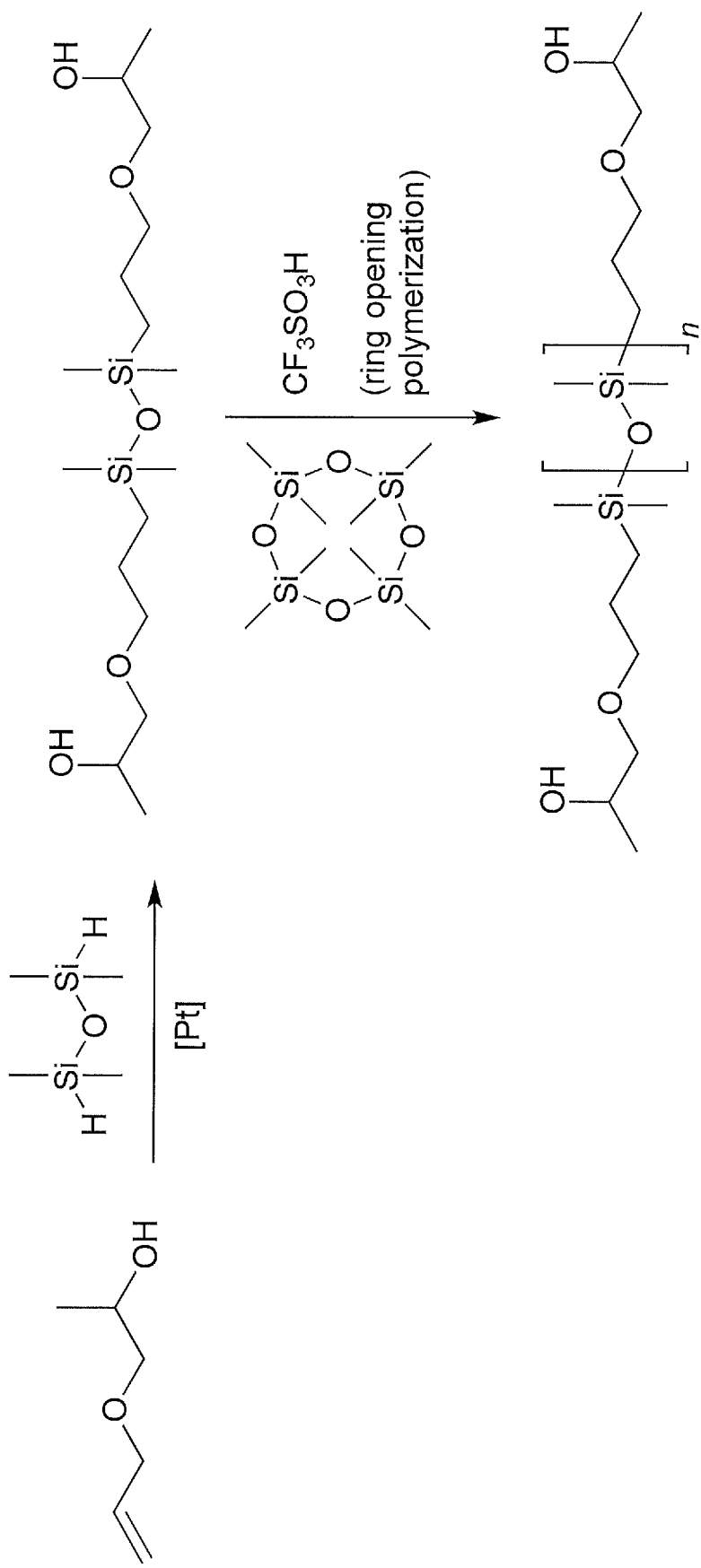

PROCESS FOR THE PREPARATION OF HYDROXYL-FUNCTIONALIZED POLYSILOXANES

FIELD OF THE INVENTION

The present invention is directed to a process for the preparation of a hydroxyl-functionalized polysiloxane. More particularly, the present invention is directed to a two-stage process for the preparation of a polysiloxane bearing hydroxyl groups bonded to a secondary carbon atom. In addition, the present invention is directed to a hydroxyl-functionalized polysiloxane obtained thereby, its use, and a silylated polymer based on the hydroxyl-functionalized polysiloxane.

BACKGROUND OF THE INVENTION

Carbinol (hydroxyl) terminated polysiloxanes are recognized as a useful class of materials, the reaction of which allows for the physicochemical properties of polysiloxanes to be incorporated either into cross-linked polymeric networks or into block copolymers further comprising, for instance, polyurethane, polyester, polycarbonate or polysulfone blocks.

The most common method for preparing carbinol (hydroxyl) terminated polysiloxanes is through hydrosilylation of Si—H terminated polysiloxanes with an ethylenically unsaturated compound bearing a hydroxyl group. However, such reactions are often associated with low conversions—depending on the molecular weight and viscosity of the Si—H terminated polymer used—and result in products having high contents of heavy metal impurities derived from the catalysts used for the hydrosilylation. The purification of the products has also proved very difficult: a corollary to the presence of impurities is that any subsequent reaction of the hydroxyl terminated polysiloxanes can result in by-products and in unstable derivative materials.

It is acknowledged that the existing literature does describe an alternative mode of synthesizing carbinol (hydroxyl) terminated polysiloxanes, whereby the hydroxyl-containing group is first attached to a disiloxane compound, following which a polymerization step is performed. The prior art processes conforming to this mode have, to date, been unsatisfactory.

U.S. Pat. No. 3,622,609 (Mironov et al.) describes carbofunctional diols of the disiloxane series which are prepared by: i) reacting organohalosilanes with an unsaturated primary alcohol selected from the group consisting of allyl alcohol, methallyl alcohol, propargyl alcohol and o-allylphenol in the presence of a tertiary amine as a hydrogen chloride acceptor and in an organic solvent medium; ii) polymerizing the resulting alkenyloxydiorganosilanes in the presence of chloroplatinic acid as a hydrosilylation catalyst; iii) boiling the mixture of siloxyalkanes thus obtained with a 10-30 percent solution of alkali metal hydroxide; and, iv) thereafter separating the desired products. It is noted that backbiting reactions (secondary reactions) occur significantly in the polymerization step.

U.S. Pat. No. 4,689,383 (Riffle et al.) describes a process for forming a polysiloxane according to the formula

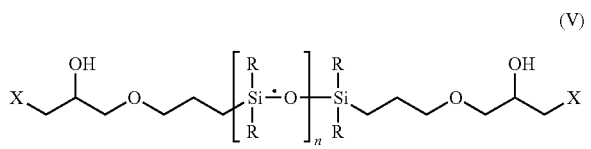

(V)

wherein: R is alkyl of 1 to 4 carbon atoms, fluoroalkyl of 1 to 4 carbon atoms, or aryl of 6 to 10 carbon atoms;
X is —OR' or —NR$^2$R$^3$ and R', R$^2$ and R$^3$ are independently hydrogen, alkyl of 1 to 4 carbon atoms, aryl of 6 to 10 carbon atoms or fluoroalkyl of 1 to 4 carbon atoms, or R$^2$ R$^3$ are joined to form a heterocyclic ring; and
n is an integer from 1 to 5000,
said process comprising the steps of:
reacting an epoxy-terminated disiloxane of the formula (I)

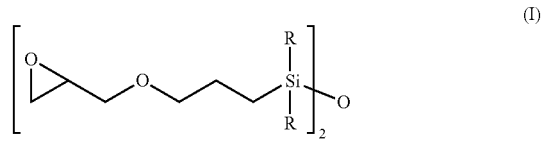

with a nucleophilic agent X to produce a compound of the formula (IIA)

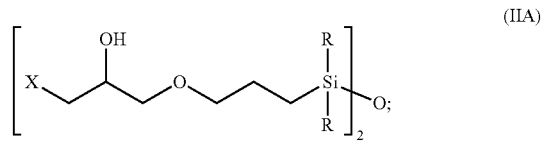

and,
treating the compound of the formula (IIA) with a cyclic polysiloxane in a redistribution reaction to form said polysiloxane. By following this methodology, the obtained polysiloxanes, apart from desired carbinol (hydroxyl) moiety, unavoidably possess an additional alkoxy or amino end-group (X).

STATEMENT OF THE INVENTION

In accordance with a first aspect of the present invention there is provided a method for producing a hydroxyl-functionalized polysiloxane having secondary or tertiary hydroxyl groups, said method comprising the steps of:
i) reacting a hydroxyalkyl allyl ether having a secondary or tertiary alcohol group with a siloxane under anhydrous conditions and in the presence of a transition metal catalyst of which the transition metal is selected from Groups 8 to 10 of the Periodic Table,
said hydroxylalkyl allyl ether conforming to Formula (I)

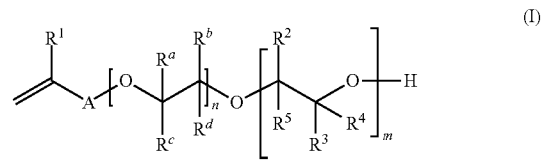

wherein n is 0, 1, 2, 3, 4 or 5, preferably 0; m is 1, 2, 3, 4 or 5, preferably 1; A denotes a spacer group which is constituted by a covalent bond or a C$_1$-C$_{20}$ alkylene group; R$^1$ is selected from hydrogen, a C$_1$-C$_8$ alkyl group, a C$_3$-C$_{10}$ cycloalkyl group, a C$_6$-C$_{18}$ aryl group or an aralkyl group; R$^a$, R$^b$, R$^c$, R$^d$, R$^2$, R$^3$, R$^4$ and R$^5$ may be the same or different and each is independently selected from hydrogen, a C$_1$-C$_8$ alkyl group, a C$_6$-C$_{18}$ aryl group or a $C_6$-$C_{18}$ aralkyl group, with the proviso that at least one of $R^3$ and $R^4$ is not hydrogen; and said siloxane conforming to Formula (II)

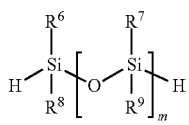

(II)

wherein m is 1, 2, 3, 4 or 5, preferably 1; $R^6$, $R^7$, $R^8$ and $R^9$ may be the same or different and each is independently selected from a $C_1$-$C_8$ alkyl group, a $C_3$-$C_{10}$ cycloalkyl group, a $C_6$-$C_{18}$ aryl group or a $C_6$-$C_{18}$ aralkyl group; and, ii) in the presence of the reaction product of step i), performing a ring opening polymerization of at least one cyclic siloxane monomer having the general Formula (III)

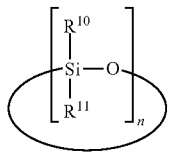

(III)

wherein n is 3, 4, 5, 6, 7 or 8, preferably 4; $R^{10}$ and $R^{11}$ may be the same or different and each is independently selected from hydrogen, a $C_1$-$C_8$ alkyl group, a $C_2$-$C_8$ alkenyl group, a $C_3$-$C_{10}$ cycloalkyl group, a $C_{6-18}$ aryl group or a $C_6$-$C_{18}$ aralkyl group.

The above defined method has been found to produce hydroxyl-functionalized polysiloxanes at high yields. Without wishing to be bound by theory, it is postulated that the reduced reactivity of the secondary or tertiary alcohol groups prevents backbiting as well as O-alkylation by-products.

In an important embodiment of Formula (I) above: n is 0; m is 1; A is a covalent bond or a $C_1$-$C_{12}$ alkylene group; $R^1$ is selected from hydrogen and a $C_1$-$C_6$ alkyl group; $R^2$, $R^3$ and $R^5$ are hydrogen; and $R^4$ is either a phenyl group or a $C_1$-$C_8$ alkyl group.

In a further embodiment, which is not intended to be mutually exclusive of the first mentioned embodiment, said hydroxyalkyl allyl ether conforming to Formula (I) is an adduct obtained by the reaction of:

a) an alcohol having allyl unsaturation and conforming to Formula (IV)

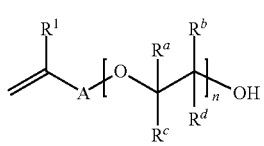

(IV)

wherein n is 0, 1, 2, 3, 4 or 5, preferably 0; A denotes a spacer group which is constituted by a covalent bond or a $C_1$-$C_{20}$ alkylene group; $R^1$ is selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group; and $R^a$, $R^b$, $R^c$ and $R^d$ may be the same or different and each is independently selected from hydrogen, a $C_1$-$C_8$ alkyl group, a $C_6$-$C_{18}$ aryl group or a $C_6$-$C_{18}$ aralkyl group; and, b) at least one alkylene oxide conforming to Formula (V) herein below

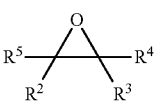

(V)

wherein $R^2$, $R^3$, $R^4$ and $R^5$ may be the same or different and are independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen.

For instance, the hydroxylalkyl allyl ether may be a product obtained by the reaction of:

i) an alcohol having allyl unsaturation selected from the group consisting of: allyl alcohol; methallyl alcohol; isoprenol (3-methyl-3-buten-1-ol); 3-methyl-2-buten-1-ol; 2-methyl-3-buten-2-ol; 4-methyl-3-penten-1-ol; hydroxybutyl vinyl ether; and 3,4-dihydroxy-1-butene; and, ii) an alkylene oxide selected from the group consisting of: propylene oxide; 1,2-butylene oxide; cis-2,3-epoxybutane; trans-2,3-epoxybutane; 1,2-epoxypentane; 1,2-epoxyhexane; decene oxide; and, styrene oxide.

In the above defined method, it is preferred that in Formula (II) each of $R^6$, $R^7$, $R^8$ and $R^9$ represents a $C_1$-$C_4$ alkyl group or a $C_5$-$C_6$ cycloalkyl group.

Generally, the above defined step i) may be performed under at least one of the following conditions: a) a molar ratio of said hydroxyalkyl allyl ether to said siloxane of equal or higher than 2:1; and b) a temperature of from 25 to 250° C., preferably from 70 to 200° C. Independent of or supplemental to these conditions, it is preferred that the transition metal catalyst present in step i) comprises at least one metal selected from the group consisting of ruthenium, rhodium, palladium, osmium, iridium and platinum and further comprises a solid support selected from the group consisting of alumina, silica and carbon.

The ring opening polymerization of step ii) is typically performed under acid catalysis and preferably said acid catalyst comprises one or more acids selected from the group consisting of: HCl; HBr; HI; $H_2SO_4$; $HClO_4$; para-toluenesulfonic acid; trifluoroacetic acid; and, perfluoroalkane sulfonic acids. In an interesting embodiment, said acid catalyst comprises or consists of trifluoromethane sulfonic acid (triflic acid, $CF_3SO_3H$). Independently of the presence of an acid catalyst, step ii) is preferably performed under anhydrous conditions and/or at a temperature in the range from 10 to 150° C., preferably from 50 to 100° C.

In accordance with a second aspect of the present invention, there is provided a hydroxyl-functionalized polysiloxane obtained by the process as defined herein above and in the appended claims. Such derived hydroxyl-functionalized polysiloxanes may be characterized by one or both of: i) a number average molecular weight (Mn) of from 500 to 150000 g/mol, preferably from 5000 to 100000; and, ii) a polydispersity index in the range from 1.0 to 5.0, preferably from 1.0 to 2.5.

In accordance with a third aspect of the present invention, curable compositions comprising the obtained hydroxyl-functionalized polysiloxane as defined hereinabove and at least one compound having at least one hydroxyl group-reactive functionality are provided.

In accordance with a fourth aspect of the present invention, the use of the obtained hydroxyl-functionalized polysiloxane as defined hereinabove as a reactive component for curable compositions, preferably coating, sealant or adhesive compositions, is documented, further comprising at least one compound having at least one hydroxyl group-reactive functionality, in particular selected from isocyanate groups, cyano groups, melamine groups, epoxy groups, acrylate groups, methacrylate groups, ester groups, carbonate groups, cyclocarbonate groups, carboxylic acid groups or anhydride groups, preferably isocyanate groups.

In accordance with a fifth aspect of the present invention there is provided a silylated polymer based on the hydroxyl-functionalized polysiloxane.

Curable compositions, in particular curable adhesive, sealant or coating compositions, comprising the silylated polymer so formed are also provided.

DEFINITIONS

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred" and "preferably" are used frequently herein to refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

The molecular weights given in the present text refer to number average molecular weights (Mn), unless otherwise stipulated. All molecular weight data refer to values obtained by gel permeation chromatography (GPC) calibrated against polystyrene standards in accordance with DIN 55672-1:2007-08 at 35° C., unless otherwise stipulated.

As used herein, "polydispersity index" refers to a measure of the distribution of molecular mass in a given polymer sample. The polydispersity index is calculated by dividing the weight average molecular weight (Mw) by the number average molecular weight (Mn).

For convenience in the description of the process of this invention, unsaturation provided by $CH_2$=CH—$CH_2$— terminal group is referred to as "allyl" unsaturation.

As used herein, "$C_1$-$C_8$ alkyl" group refers to a monovalent group that contains 1 to 8 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and, 2-ethylhexyl. In the present invention, such alkyl groups may be unsubstituted or may be substituted with one or more substituents such as halo, nitro, cyano, amido, amino, sulfonyl, sulfinyl, sulfanyl, sulfoxy, urea, thiourea, sulfamoyl, sulfamide and hydroxy. The halogenated derivatives of the exemplary hydrocarbon radicals listed above might, in particular, be mentioned as examples of suitable substituted alkyl groups. In general, however, a preference for unsubstituted alkyl groups containing from 1-6 carbon atoms ($C_1$-$C_6$ alkyl)—for example unsubstituted alkyl groups containing from 1 to 4 carbon atoms ($C_1$-$C_4$ alkyl)—should be noted.

The term "$C_1$-$C_{20}$ alkylene group" refers to a divalent group that contains from 1 to 20 carbon atoms, that is a radical of an alkane and includes linear and branched organic groups, which groups may be substituted or substituted. In general, a preference for unsubstituted alkylene groups containing from 1-12 carbon atoms ($C_1$-$C_{12}$ alkylene)—for example unsubstituted alkylene groups containing from 1 to 6 carbon atoms ($C_1$-$C_6$ alkylene) or from 1 to 4 carbons atoms ($C_1$-$C_4$ alkylene)—should be noted.

As used herein, "$C_2$-$C_8$ alkenyl" group refers to an aliphatic carbon group that contains 2 to 8 carbon atoms and at least one double bond. Like the aforementioned alkyl group, an alkenyl group can be straight or branched, and may optionally be substituted. Examples of $C_2$-$C_8$ alkenyl groups include, but are not limited to: allyl; isoprenyl; 2-butenyl; and, 2-hexenyl.

The term "$C_3$-$C_{10}$ cycloalkyl" is understood to mean a saturated, mono-, bi- or tricyclic hydrocarbon group having from 3 to 10 carbon atoms. Examples of cycloalkyl groups include: cyclopropyl; cyclobutyl; cyclopentyl; cyclohexyl; cycloheptyl; cyclooctyl; adamantane; and, norbornane.

As used herein, an "$C_6$-$C_{18}$ aryl" group used alone or as part of a larger moiety—as in "aralkyl group"—refers to optionally substituted, monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. Exemplary aryl groups include: phenyl; indenyl; naphthalenyl, tetrahydronaphthyl, tetrahydroindenyl; tetrahydroanthracenyl; and, anthracenyl. And a preference for phenyl groups may be noted.

As used herein, an "aralkyl" group refers to an alkyl group that is substituted with an aryl group. An example of an aralkyl group is benzyl.

Where mentioned, the expression "interrupted by at least one heteroatom" means that the main chain of a residue comprises, as a chain member, at least one atom that differs from carbon atom.

In accordance with established terminology, a "secondary alcohol group" or a "secondary hydroxyl group" is constituted by a hydroxy group (—OH) attached to a saturated carbon atom which has two other carbon atoms attached to it. Analogously, a "tertiary alcohol group" or "tertiary hydroxyl group" is constituted by a hydroxy group (—OH) attached to a saturated carbon atom which has three other carbon atoms attached to it.

The term "polyisocyanate" means a compound which has at least two isocyanate groups —NCO. This compound does not have to be a polymer, and instead is frequently a low molecular compound.

The term "polymerization conditions" means the reaction conditions necessary to combine monomers into polymers, and in the context of this invention, those conditions necessary for ring-opened cyclic siloxanes to combine with one another to form a silicone polymer within a polymer matrix.

As used herein, the term "ring-opening polymerization" denotes a polymerization in which a cyclic compound (monomer) is opened to form a linear polymer. Ring-opening polymerization with respect to siloxane chemistry specifically relates to a polymerization reaction using cyclosiloxane monomers, in which reaction the ring of the cyclosiloxane monomer is opened in the presence of an appropriate catalyst. The reaction system tends towards an equilibrium between the desired resulting high-molecular compounds, a mixture of cyclic compounds and/or linear oligomers, the attainment of which equilibrium largely depends on the nature and amount of siloxane(s), the catalyst used and on the reaction temperature. The use of solvents and/or emulsions in the polymerization is not recommended as their removal once the reaction is complete can be complex.

Various mechanisms of anionic and cationic ring opening polymerization of cyclic siloxane monomers which might find utility in the present invention are disclosed inter alia in: i) Lebedev, B. V et al. *Thermodynamics of Poly(dimethyldisiloxane) in the Range of 0-350 K.* Vysokomol. Soed. Ser. A (1978), 20, pages 1297-1303; ii) Duda, A. et al. *Thermodynamics and Kinetics of Ring-Opening Polymerization in Handbook of Ring-Opening Polymerization*, Wiley-VCH, Weinheim, Germany, (2009) page 8; iii) Ackermann, J. et al. *Chemie und Technologie der Silikone II. Herstellung und Verwendung von Siliconpolymeren*, Chemie in unserer Zeit (1989), 23, pages 86-99; and, iv) Chojnowski, J. et al. *Cationic Polymerization of Siloxanes* Die Macromolekulare Chemie 175, pp. 3299-3303 (1974); v) Choijnowski, J. et al. *Kinetically controlled ring-opening polymerization*, J. Inorg. Organomet. Polym. (1991) 1, pages 299-323; and, vi) Nuyken et al. *Ring-Opening Polymerization—An Introductory Review Polymers* 2013, 5, 361-403.

As used herein, the term "catalytic amount" means a sub-stoichiometric amount of catalyst relative to a reactant.

The term "anhydrous" is intended to mean herein that the applicable reaction mixture or component comprises less than 0.1 wt. % of water, based on the weight of the mixture or component.

DETAILED DESCRIPTION OF THE INVENTION

Synthesis Step i)

As described hereinbefore, the first synthesis step of the present invention comprises the reaction of a) a hydroxyalkyl allyl ether having a secondary or tertiary alcohol group, in accordance with Formula (I) with b) a siloxane of Formula (II).

Hydroxyalkyl-Allyl Ethers

The hydroxyalkyl-allyl ethers of the present invention, which possess allyl unsaturation and a secondary or tertiary hydroxyl group, conform to the following general Formula (I)

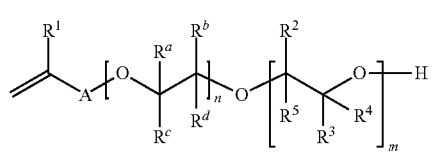

(I)

wherein n is 0, 1, 2, 3, 4 or 5, preferably 0; m is 1, 2, 3, 4 or 5, preferably 1; A denotes a spacer group which is constituted by a covalent bond or a $C_1$-$C_{20}$ alkylene group; $R^1$ is selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group; $R^a$, $R^b$, $R^c$, $R^d$, $R^2$, $R^3$, $R^4$ and $R^5$ may be the same or different and each is independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen.

Compounds conforming to Formula (I) are most suitably derived as alkylene oxide adducts of primary or secondary alcohols having ally unsaturation.

Said alcohols having allyl unsaturation will conform to Formula (IV) herein below:

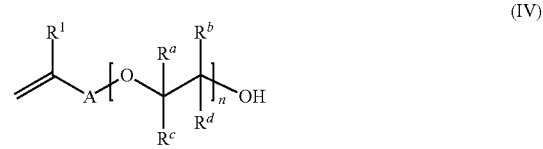

(IV)

wherein n, A, $R^1$, $R^a$, $R^b$, $R^c$ and $R^d$ have the meanings assigned above. In a preferred embodiment: n is 0; A is either a covalent bond or a $C_1$-$C_{12}$ alkylene group; and, $R^1$ is selected from hydrogen and a $C_1$-$C_6$ alkyl group and, more preferably, from hydrogen and a $C_1$-$C_4$ alkyl group.

Suitable alcohols having allyl unsaturation for use in the present invention include: allyl alcohol; methallyl alcohol; 3-buten-1-ol; isoprenol (3-methyl-3-buten-1-ol); 2-methyl-3-buten-1-ol; 2-methyl-3-buten-2-ol; 1-penten-3-ol; 3-methyl-1-penten-3-ol; and, 4-methyl-1-penten-3-ol. Particular preference is given to using allyl alcohol or methallyl alcohol.

The alkylene oxide conforms to Formula (V) herein below

(V)

wherein $R^2$, $R^3$, $R^4$ and $R^5$ may be the same or different and are independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen. It is preferred that $R^2$, $R^3$ and $R^5$ are hydrogen and $R^4$ is either a phenyl group or a $C_1$-$C_8$ alkyl group and, more preferably, a $C_1$-$C_4$ alkyl group.

Suitable alkylene oxide reactants include one or more of: propylene oxide; 1,2-butylene oxide; cis-2,3-epoxybutane; trans-2,3-epoxybutane; 1,2-epoxypentane; 1,2-epoxyhexane; decene oxide; and, styrene oxide. Particular preference is given to using propylene oxide.

Any known method for forming such adducts may be employed. However, commonly, in the presence of a basic catalyst, a controlled amount of alkylene oxide is slowly mixed with the preheated alcohol over a reaction time of up to 20 hours and in an amount sufficient to form the desired oxyalkylated reaction product. The unsaturated alcohol should be free of water and may therefore be vacuum stripped in advance of being preheated to a temperature, typically, of from 75 to 150° C.

During the introduction of the oxide, the concentration of unreacted alkylene oxide in the liquid reaction mixture and the current degree of addition of the alkylene oxide onto the unsaturated starter can be monitored by known methods. These methods include, but are not limited to: optical methods, such as Infrared and Raman spectroscopy; viscosity and mass flow measurements, after appropriate calibration; measurement of the dielectric constant; and, gas chromatography.

If desired, the oxyalkylation may be carried out in a suitable solvent, such as an aromatic hydrocarbon—illustratively toluene or benzene—or, alternatively, an aliphatic hydrocarbon solvent having from 5 to 12 carbon atoms, such as heptane, hexane or octane. Where solvents are used, aliphatic solvents are preferred in order to obviate the potential toxic associations connected with use of aromatic hydrocarbon solvents.

Suitable basic catalysts, which may be used individually or in admixture, include: alkali metal hydroxides such as KOH, NaOH and CsOH; alkaline earth metal hydroxides, such as $Ca(OH)_2$ and $Sr(OH)_2$; and, alkali metal alkoxides, such as KOMe, NaOMe, KOt-Bu and NaOt-Bu. The catalysts should typically be employed in an amount of from 0.05 to 0.5 wt. %, based on the total weight of the reactants and can be used either as solids, solutions or suspensions. It is also possible to add only part of the catalyst at the beginning of the reaction and introduce further catalysts in one or more portions at a later point in time; the later added fraction of catalyst may be identical or different to the initial catalyst and the amount of solvent present at each addition of catalyst can be moderated to ensure the efficacy of catalyst.

For completeness, illustrative citations describing the alkoxylation of allyl alcohol include: U.S. Pat. Nos. 9,073, 836; 3,268,561; 4,618,703; and, J. Am. Chem. Soc. 71 (1949) 1152.

Siloxanes

The siloxane reactants of the first synthetic step of the present invention are represented by the Formula (II) herein below:

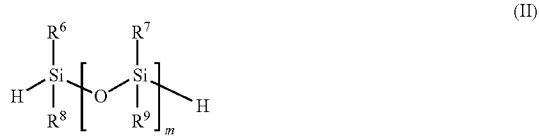

(II)

wherein m is 1, 2, 3, 4 or 5, preferably 1; $R^6$, $R^7$, $R^8$ and $R^9$ may be the same or different and each is independently selected from a $C_1$-$C_8$ alkyl group, a $C_3$-$C_{10}$ cycloalkyl group, a $C_6$-$C_{18}$ aryl group or a $C_6$-$C_{18}$ aralkyl group.

In a preferred embodiment, the siloxane of Formula (II) is a disiloxane.

In an embodiment, each of $R^6$, $R^7$, $R^8$ and $R^9$ represents a $C_1$-$C_6$ alkyl group or a $C_3$-$C_6$ cycloalkyl group. Preferably, each of $R^6$, $R^7$, $R^8$ and $R^9$ represents a $C_1$-$C_4$ alkyl group or a $C_5$-$C_6$ cycloalkyl group. For example, at least two of $R^6$, $R^7$, $R^8$ and $R^9$ may be a $C_1$-$C_4$ or $C_1$-$C_2$ alkyl group. Most particularly, it is preferred that each of $R^6$, $R^7$, $R^8$ and $R^9$ of Formula (II) are methyl ($C_1$).

For completeness, an illustrative list of siloxanes of Formula (II) include: 1,1,3,3-tetramethyldisiloxane; 1,1,3,3-tetraethyldisiloxane; 1,1,3,3-tetra-n-propyldisiloxane; 1,1,3,3-tetraisopropyldisiloxane; 1,1,3,3-tetra-n-butyldisiloxane; 1,1,3,3-tetraisobutyldisiloxane; 1,1,3,3-tetra-sec-butyldisiloxane; 1,1,3,3-tetra-tert-butyldisiloxane; 1,1,3,3-tetracyclopentyldisiloxane; 1,1,3,3-tetracyclohexyldisiloxane; 1,3-di-ethyl-1,3-dimethyldisiloxane; 1,3-dimethyl-1,3-di-n-propyldisiloxane; 1,3-dimethyl-1,3-diisopropyldisiloxane; 1,3-di-n-butyl-1,3-dimethyldisiloxane; 1,3-diisobutyl-1,3-dimethyldisiloxane; 1,3-di-sec-butyl-1,3-dimethyldisiloxane; 1,3-di-tert-butyl-1,3-dimethyldisiloxane; 1,3-dicyclopentyl-1,3-dimethyldisiloxane; 1,3-dicyclohexyl-1,3-dimethyldisiloxane; 1,3-diethyl-1,3-di-n-propyldisiloxane; 1,3-diethyl-1,3-diisopropyldisiloxane; 1,3-di-n-butyl-1,3-diethyldisiloxane; 1,3-diisobutyl-1,3-diethyldisiloxane; 1,3-di-sec-butyl-1,3-diethyldisiloxane; 1,3-di-tert-butyl-1,3-diethyldisiloxane; 1,3-dicyclopentyl-1,3-diethyldisiloxane; and, 1,3-dicyclohexyl-1,3-diethyldisiloxane.

The siloxanes of the general Formula (II) may be commercial products or can be prepared by processes known in organosilicon chemistry. For example, the dihydrotetra(organyl)siloxanes are obtainable by hydrolysis of halodi(organyl)-H-silanes. Said halodi(organyl)-H-silanes are themselves either commercially available products or are obtainable by, for example: the direct synthesis of silicon with haloorganyls following the Müller-Rochow process; and, salt elimination reactions of metal organyls—such as Grignard reagents or lithium organyls—with dihalo(organyl)silanes.

Process Conditions

The hydroxyalkyl-allyl ether of Formula (I) and the siloxane of Formula (II) are generally reacted such that the molar ratio of said adduct to said siloxane is equal or higher than 2:1. The reaction may be carried out under atmospheric or elevated pressure. Further, the reaction is carried out at a temperature from 25 to 250° C. and preferably from 70 to 200° C. And in carrying out the reaction, organic solvents may or may not be used but, when employed, solvents such as toluene, xylene, heptane, dodecane, ditolylbutane, cumene and mixtures thereof are preferred.

Importantly, the reaction is performed under anhydrous conditions and in the presence of a catalyst, wherein the catalyst used is a transition metal catalyst of which the transition metal is selected from Groups 8 to 10 of the Periodic Table and more usually from the group consisting of ruthenium, rhodium, palladium, osmium, iridium, platinum and combinations thereof.

As illustrative but non-limiting examples of such catalysts may be mentioned: platinum catalysts, such as platinum black powder, platinum supported on silica powder, platinum supported on alumina powder, platinum supported on carbon powder (e.g., activated carbon), chloroplatinic acid, 1,3-divinyltetramethyldisiloxane complexes of platinum, carbonyl complexes of platinum and olefin complexes of platinum; palladium catalysts, such as palladium supported on silica powder, palladium supported on alumina powder, palladium supported on carbon powder (e.g., activated carbon), carbonyl complexes of palladium and olefin complexes of palladium; ruthenium catalysts, such as $RhCl_3$ $(Bu_2S)_3$, ruthenium 1,3-ketoenolate and ruthenium carbonyl compounds such as ruthenium 1,1,1-trifluoroacetylacetonate, ruthenium acetylacetonate and triruthinium dodecacarbonyl; and, rhodium catalysts, such as rhodium supported on silica powder, rhodium supported on alumina powder, rhodium supported on carbon powder (e.g., activated carbon), carbonyl complexes of rhodium and olefin complexes of rhodium. Preferred catalysts take the form of said transition metals supported on a powder such as alumina, silica, or carbon; platinum supported on carbon powder is particularly preferred for use as the catalyst in the present method.

Without intention to limit the catalytic amount of the transition metal catalysts used in step i) of the present method, typically the catalyst is used in an amount that provides from 0.0001 to 1 gram of catalytic metal per equivalent of silicon-bonded hydrogen in the siloxane.

The progress of the reaction and, in particular, the consumption of the unsaturated group of the hydroxyalkyl allyl ether can be monitored by known methods. This aside, the reaction generally requires a time of 0.5 to 72 hours to reach completion, more commonly from 1 to 30 or 1 to 20 hours.

Upon completion of the reaction, it is facile to remove any solid, suspended compounds by, for example, filtration, crossflow filtration or centrifugation. Further, the reaction product may be worked up, using methods known in the art, to isolate and purify the product. For example, any solvent present may be removed by stripping at reduced pressure.

Synthesis Step ii)

In a reaction vessel which is capable of imparting shear to the contents thereof and under polymerization conditions, the product of step i) is reacted with at least one cyclic siloxane having the general Formula (III) as described herein below:

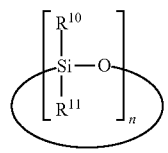

(III)

wherein n is 3, 4, 5, 6, 7 or 8, preferably 4; $R^{10}$ and $R^{11}$ may be the same or different and each is independently selected from hydrogen, a $C_1$-$C_8$ alkyl group, a $C_2$-$C_8$ alkenyl group, a $C_3$-$C_{10}$ cycloalkyl group, a $C_6$-$C_{18}$ aryl group or a $C_6$-$C_{18}$ aralkyl group.

For completeness, the use of mixtures of co-polymerizable cyclic siloxane monomers is envisaged in the present invention. Further, whilst suitable cyclic siloxane monomers will generally contain "n" identical $R^{10}$ groups and "n" identical $R^{11}$ groups, the $R^{10}$ and $R^{11}$ groups attached to a given silicon atom need not necessarily be the same as those attached to an adjacent silicon atom. For example, the monomers $[(C_2H_5)(C_6H_5)SiO]_2[(C_2H_5)_2SiO]$ and $[(C_2H_5)(C_6H_5)SiO][(C_2H_5)_2SiO]_2$ are considered monomers within the terms of Formula (III).

In an embodiment, each $R^{10}$ and $R^{11}$ may independently represent a $C_1$-$C_8$ alkyl group. An exemplary, but not limiting list of cyclic siloxanes of meeting this embodiment of Formula (III) includes: $[(CH_3)_2SiO]_8$; $[(CH_3)_2SiO]_7$; $[(CH_3)_2 SiO]_6$; decamethylcyclopentasiloxane ($D_5$); octamethylcyclotetrasiloxane ($D_4$); hexamethylcyclotrisiloxane ($D_3$); $[(CH_3)(C_2H_5)SiO]_3$; $[(CH_3)(C_2H_5)SiO]_4$; $[(CH_3)(C_2H_5)SiO]_5$; $[(CH_3)(C_2H_5)SiO]_6$; $[(C_2H_5)_2SiO]_3$; $[(C_2H_5)_2SiO]_4$; and, $[(C_2H_5)_2SiO]_5$. Within said embodiment, it is preferred that $R^{10}$ and $R^{11}$ are the same. More particularly, it is preferred that $R^{10}$ and $R^{11}$ of the cyclic siloxanes of Formula (III) are both methyl ($C_1$). Good results have, for instance, been obtained when the cyclic siloxane of Formula (III) is octamethylcyclotetrasiloxane ($D_4$).

Whilst the above preferences should be duly noted, further cyclic siloxane monomers of Formula (III) which might find utility in the present invention include: octaphenylcyclotetrasiloxane; tetramethylcyclotetrasiloxane; tetramethyltetravinylcyclotetrasiloxane; $[(C_6H_5)_2SiO]_3$; $[(C_2H_5)(C_6H_5)SiO]_3$; and, $[(C_2H_5)(C_6H_5)SiO]_4$.

Whilst there is not specific intention to limit the mechanism of ring opening polymerization employed in the present invention and whilst therefore ring opening polymerization of cyclic siloxane monomers by the anionic route, via basic catalysts is not strictly precluded, it is preferred herein for said polymerization to proceed by a cationic route, via acid catalysis. Broadly, any suitable acidic ring opening polymerization catalyst may be utilized herein and, equally, mixtures of catalysts may be employed. Both Lewis and Brønsted acids may be suitable in this context, but the latter are preferred as they tend to be effective at temperatures of less than 150° C. and are usually effective at temperatures of from 50 to 100° C.

Examples of suitable Lewis acids include but are not limited to: $BF_3$; $AlCl_3$; t-BuCl/$Et_2AlCl$; $Cl_2$/$BCl_3$; $AlBr_3$; $AlBr_3 \cdot TiCl_4$; $I_2$; $SbCl_5$; $WCl_6$; $AlEt_2Cl$; $PF_5$; $VCl_4$; $AlEtCl_2$; $BF_3Et_2O$; $PCl_5$; $PCl_3$; $POCl_3$; $TiCl_3$; and, $SnCl_4$.

Examples of Brønsted acid or proton acid type catalysts—which may optionally be disposed on solid, inorganic supports—include, but are not limited to: HCl; HBr; HI; $H_2SO_4$; $HClO_4$; para-toluenesulfonic acid; trifluoroacetic acid; and, perfluoroalkane sulfonic acids, such as trifluoromethane sulfonic acid (or triflic acid, $CF_3SO_3H$), $C_2F_5SO_3H$, $C_4F_9SO_3H$, $C_5F_{11}SO_3H$, $C_6F_{13}SO_3H$ and $C_8F_{17}SO_3H$. The most preferred of these strong acids is trifluoromethane sulfonic acid (triflic acid, $CF_3SO_3H$).

The catalysts for said ring opening polymerization may usually be employed at a concentration of from 1 to 1000 ppm by weight based on the total weight of the cyclic siloxane monomers to be polymerized. Preferably from 5 to 150 ppm by weight are used, most preferably from 5 to 50 ppm. The catalytic amount may be reduced when the temperature at which the monomers and the catalyst are contacted is increased.

The ring opening polymerization may conveniently be carried out at a temperature in the range from 10 to 150° C. Preferably, however, the temperature range is from 20 or 50 to 100° C. as obviating high temperatures can limit the loss of volatile cyclic siloxanes from the reaction mixture due to their lower boiling point.

The process pressure is not critical. As such, the polymerization reaction can be run at sub-atmospheric, atmospheric, or super-atmospheric pressures but pressures at or above atmospheric pressure are preferred.

Importantly, the reaction should be performed under anhydrous conditions and in the absence of any compound having an active hydrogen atom. Exposure to atmospheric moisture may be avoided by providing the reaction vessel with an inert, dry gaseous blanket. Whilst dry nitrogen and argon may be used as blanket gases, precaution should be used when common nitrogen gas is used as a blanket, because such nitrogen may not be dry enough on account of its susceptibility to moisture entrainment; the nitrogen may require an additional drying step before its use herein.

The duration of the reaction is dependent on the time taken for the system to reach equilibrium. Equally, however, it is understood that the desired product can be obtained by stopping the equilibration at exactly the desired time: for example, the reaction can be monitored by analyzing viscosity over time or by analyzing monomer conversion using gas chromatography and the reaction stopped when the desired viscosity or monomer conversion is attained. These considerations aside, the polymerization reaction generally takes place for from 0.5 to 72 hours and more commonly from 1 to 30 or 1 to 20 hours. Acid catalysts present in the reaction mixture at the end of the polymerization reaction can easily be neutralized in order to stabilize the reaction product.

Upon completion of the polymerization, it is possible to remove any solid, suspended compounds by, for example, filtration, crossflow filtration or centrifugation. Further, the output of the polymerization may be worked up, using methods known in the art, to isolate and purify the hydroxyl-functionalized polysiloxanes. Mention in this regard may be made of extraction, evaporation, distillation and chromatography as suitable techniques. Upon isolation, it has been found that typical yields of the hydroxyl-functionalized polysiloxanes are at least 40% and often at least 60%.

The hydroxyl-functionalized polysiloxanes derived in the present invention may possess a molecular weight (Mn) of from 500 to 150000 g/mol, preferably from 5000 to 100000, more preferably from 10000 to 100000. Moreover, the polymers may be characterized by a polydispersity index in the range from 1.0 to 5.0, preferably from 1.0 to 2.5.

Illustrative Embodiment of the Method of the Present Invention

An interesting but illustrative and non-limiting embodiment of the present invention may be defined as a method for producing a hydroxyl-functionalized polysiloxane having secondary hydroxyl groups, said method comprising the steps of:

i) reacting a hydroxyalkyl allyl ether having a secondary hydroxyl group with a siloxane under anhydrous conditions and in the presence of a transition metal catalyst comprising at least one metal selected from the group consisting of ruthenium, rhodium, palladium, osmium, iridium and platinum and further comprising a powdered support selected from the group consisting of alumina, silica and carbon, said hydroxylalkyl allyl ether conforming to Formula (I)

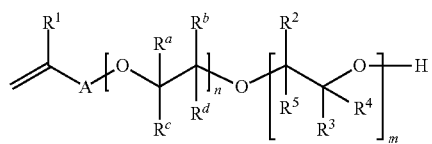

(I)

wherein n is 0; m is 1; A denotes a spacer group which is constituted by a covalent bond or a $C_1$-$C_{12}$; $R^1$ is selected from hydrogen and a $C_1$-$C_6$ alkyl group; $R^2$, $R^3$ and $R^5$ are hydrogen; and $R^4$ is either a phenyl group or a $C_1$-$C_8$ alkyl group; and said siloxane conforming to Formula (II)

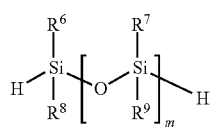

(II)

wherein m is 1, 2, 3, 4 or 5, preferably 1; $R^6$, $R^7$, $R^8$ and $R^9$ may be the same or different and each is independently represents a $C_1$-$C_4$ alkyl group or a $C_5$-$C_6$ cycloalkyl group;

ii) in the presence of the reaction product of step i) and under acid catalysis, performing a ring opening polymerization of at least one cyclic siloxane having the general Formula (III)

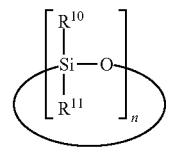

(III)

wherein n is 3, 4, 5, 6, 7 or 8, preferably 4; $R^{10}$ and $R^{11}$ may the same or different and each independently represents a $C_1$-$C_8$ alkyl group.

BRIEF DESCRIPTION OF THE DRAWINGS

FIG. 1 appended hereto illustrates a reaction scheme in accordance with this illustrative embodiment of the present invention.

COMPOSITIONS AND APPLICATIONS OF THE HYDROXYL-FUNCTIONALIZED POLYSILOXANES

It is anticipated that the hydroxyl-functionalized polysiloxanes of the present invention per se may find utility as a curable, crosslinkable or otherwise reactive component of a coating composition, a sealant composition or an adhesive composition, such as a pressure sensitive adhesive composition. Said compositions may comprise, in addition to the hydroxyl-functionalized polysiloxanes, at least one compound having at least one hydroxyl group-reactive functionality, preferably selected from isocyanate groups, cyano groups, melamine groups, epoxy groups, acrylate groups, methacrylate groups, ester groups, carbonate groups, cyclocarbonate groups, carboxylic acid groups or anhydride groups, more preferably isocyanate groups, may be mentioned as illustrative further components of the compositions.

The present invention also provides a silylated polymer based on the hydroxyl-functionalized polysiloxane.

In a preferred embodiment of the present invention, the silylated polymer may be obtained by reacting (i.e., endcapping) the hydroxyl-functionalized polysiloxanes with isocyanatosilane and for the inclusion of said silylated polymer in a curable composition, such as a curable coating, sealant or adhesive composition. Commonly, to form a silylated prepolymer, the hydroxyl-functionalized polysiloxanes may be reacted with at least one isocyanatosilane of Formula (VI):

$$OCN-B-Si-(X)_m(R^{12})_{3-m} \quad (VI)$$

wherein m is 0, 1 or 2, preferably 0 or 1; each $R^{12}$ is independently selected from a hydroxyl group, a $C_1$-$C_{10}$ alkoxy group, a $C_1$-$C_{10}$ acyloxy group, or —OCH($R^{13}$)COOR$^{14}$, wherein $R^{13}$ is selected from hydrogen or a $C_1$-$C_4$ alkyl group; and $R^{14}$ is selected from a $C_1$-$C_8$ alkyl group; each X is independently selected from a $C_1$-$C_8$ alkyl group which can optionally be interrupted by at least one heteroatom; and B is selected from a $C_1$-$C_{20}$ alkylene group. Preferably each $R^{12}$ is independently selected from a $C_1$-$C_4$ alkoxy or acyloxy group and, more preferably, each $R^{12}$ is independently selected from a methoxy or ethoxy group.

As an exemplary, but non-limiting, list of compounds meeting Formula (VI), the following may be mentioned: 3-isocyanatopropyltrimethoxysilane, 2-isocyanatoisopropyltrimethoxysilane, 4-isocyanato-n-butyltrimethoxysilane, 2-isocyanato-1,1-dimethylethyltrimethoxysilane, 1-isocyanato-methyltrimethoxysilane, 3-isocyanatopropyltriethoxysilane, 2-isocyanato-2-methylethyl-triethoxysilane, 4-isocyanatobutyltriethoxy-silane, 2-isocyanato-1,1-dimethylethyl-triethoxysilane, 1-isocyanatomethyltriethoxysilane, 3-isocyanatopropylmethyldimethoxysilane, 3-isocyanatopropyld imethylmethoxysilane, 3-isocyanatopropylphenylmethylmethoxysilane, 1-isocyanatomethylmethyldimethoxysilane, 3-isocyanatopropylethyldiethoxysilane, 3-isocyanatopropylmethyldiethoxysilane and 1-isocyanatomethylmethyldiethoxysilane. These compounds may be reacted with the hydroxyl-functionalized polysiloxanes either alone or in admixture.

The end-capping reaction may be performed under catalysis, with suitable catalysts being well-known to a person of ordinary skill in the art. In principle, any compound that can catalyze the reaction of a hydroxyl group and an isocyanato group to form a urethane bond can be used. And examples thereof include: tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides such as dibutyltin oxide and dioctyltin oxide; reaction products between dibutyltin oxides and phthalic acid esters; dibutyltin bisacetylacetonate; titanates such as tetrabutyl titanate and tetrapropyl titanate; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo-(5,4,0)-undecene-7 (DBU); aliphatic carboxylate salts or acetylacetonates of potassium, iron, indium, zinc, bismuth, or copper.

In another preferred embodiment, the silylated polymer may be obtained by reacting the hydroxyl-functionalized polysiloxane with at least one polyisocyanate, preferably diisocyanate, with a stoichiometric excess of the NCO groups of the polyisocyanate with respect to the OH groups of the hydroxyl-functionalized polysiloxane to form a NCO-terminated prepolymer; and reacting the NCO-terminated prepolymer with at least one silane having at least one NCO group-reactive functionality. Preferably the silane having at least one NCO group-reactive functionality conforms to Formula (VII):

$$R^{15}R^{16}N-R^{17}-SiXYZ \quad (VII)$$

wherein $R^{15}$ and $R^{16}$ are independently selected from hydrogen or a $C_1$-$C_8$ alkyl group; $R^{17}$ is a divalent hydrocarbon residue having 1 to 12 carbon atoms, optionally comprising at least one heteroatom, preferably N or O; and X, Y, Z are independently selected from a hydroxyl group, a $C_1$-$C_8$ alkyl group, a $C_1$-$C_8$ alkoxy group or a $C_1$-$C_8$ acyloxy group, at least one of the substituents X, Y, Z being selected from a $C_1$-$C_8$ alkoxy or a $C_1$-$C_8$ acyloxy group. The linking group $R^{17}$ can, for example, be a linear, branched or cyclic, substituted or unsubstituted alkylene residue. Nitrogen (N) or oxygen (O) may be contained therein as a heteroatom. If X, Y and/or Z are an acyloxy group, this can be e.g., the acetoxy group —OCO—$CH_3$.

The polyisocyanates suitable for preparing the NCO-terminated prepolymer include ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis(2-isocyanatoethyl)fumarate, 1-isocyanato-3,3,5-trimethyl-5-isocyanatomethylcyclohexane (isophorone diisocyanate, IPDI), 2,4- and 2,6-hexahydrotoluylene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, 2,4- or 2,6-toluylene diisocyanate (TDI), 2,4'-diphenylmethane diisocyanate, 2,2'-diphenylmethane diisocyanate, or 4,4'-diphenylmethane diisocyanate (MDI), and the isomeric mixtures thereof. Also suitable are partially or completely hydrogenated cycloalkyl derivatives of MDI, for example completely hydrogenated MDI ($H_{12}$-MDI), alkyl-substituted diphenylmethane diisocyanates, for example mono-, di-, tri-, or tetraalkyldiphenylmethane diisocyanate and the partially or completely hydrogenated cycloalkyl derivatives thereof, 4,4'-diisocyanatophenylperfluorethane, phthalic acid-bis-isocyanatoethyl ester, 1 chloromethylphenyl-2,4- or -2,6-diisocyanate, 1-bromomethylphenyl-2,4- or -2,6-diisocyanate, 3,3'-bis-chloromethyl ether-4,4'-diphenyl diisocyanate, sulfur-containing diisocyanates such as those obtainable by reacting 2 moles diisocyanate with 1 mole thiodiglycol or dihydroxydihexyl sulfide, diisocyanates of dimer fatty acids, or mixtures of two or more of the named diisocyanates. The polyisocyanate is preferably IPDI, TDI or MDI.

Other polyisocyanates suitable for use in accordance with the invention are isocyanates with a functionality of three or more obtainable, for example, by oligomerization of diisocyanates, more particularly by oligomerization of the isocyanates mentioned above. Examples of such tri- and higher isocyanates are the triisocyanurates of HDI or IPDI or mixtures thereof or mixed triisocyanurates thereof and polyphenyl methylene polyisocyanate obtainable by phosgenation of aniline/formaldehyde condensates.

According to the invention, there is a stoichiometric excess of NCO groups of the polyisocyanates with respect to OH groups of the hydroxyl-functionalized polysiloxanes. The ratio of the number of OH groups of the hydroxyl-functionalized polysiloxanes to the number of NCO groups of the polyisocyanates is particularly preferably 1:3 to 1:1.1, in particular 1:2.5 to 1:1.5.

A curable composition, such as a coating, sealant or adhesive composition comprising either the hydroxyl-functionalized polysiloxanes or the silylated polymer(s) obtained therefrom will typically further comprise adjuvants and additives that can impart improved properties to these compositions. For instance, the adjuvants and additives may impart one or more of: improved elastic properties; improved elastic recovery; longer enabled processing time; faster curing time; and, lower residual tack. Included among such adjuvants and additives are catalysts, plasticizers, stabilizers, antioxidants, fillers, reactive diluents, drying agents, adhesion promoters and UV stabilizers, fungicides, flame retardants, rheological adjuvants, color pigments or color pastes, and/or optionally also, to a small extent, solvents.

A "plasticizer" for the purposes of this invention is a substance that decreases the viscosity of the composition and thus facilitates its processability. Herein the plasticizer may constitute up to 40 wt. % or up to 20 wt. %, based on the total weight of the composition, and is preferably selected from the group consisting of: polydimethylsiloxanes (PDMS); diurethanes; ethers of monofunctional, linear or branched C4-C16 alcohols, such as Cetiol OE (obtainable from Cognis Deutschland GmbH, Düsseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as end-capped polyethylene or polypropylene glycols; polystyrene; hydrocarbon plasticizers; chlorinated paraffin; and, mixtures thereof. It is noted that, in principle, phthalic acid esters can be used as the plasticizer but these are not preferred due to their toxicological potential. It is preferred that the plasticizer comprises or consists of one or more polydimethylsiloxane (PDMS).

"Stabilizers" for purposes of this invention are to be understood as antioxidants, UV stabilizers or hydrolysis stabilizers. Herein stabilizers may constitute in toto up to 10 wt. % or up to 5 wt. %, based on the total weight of the composition. Standard commercial examples of stabilizers suitable for use herein include sterically hindered phenols and/or thioethers and/or substituted benzotriazoles and/or amines of the hindered amine light stabilizer (HALS) type. It is preferred in the context of the present invention that a UV stabilizer that carries a silyl group—and becomes incorporated into the end product upon crosslinking or curing—be used: the products Lowilite™ 75, Lowilite™ 77 (Great Lakes, USA) are particularly suitable for this purpose. Benzotriazoles, benzophenones, benzoates, cyanoacrylates, acrylates, sterically hindered phenols, phosphorus and/or sulfur can also be added.

The curable compositions may further comprise up to 5 wt. %, for example from 0.01 to 3 wt. %, based on the total weight of the composition, of catalyst. The catalysts that can be used are all known compounds that can catalyze hydrolytic cleavage of the hydrolyzable groups of the silane groupings, as well as the subsequent condensation of the Si—OH group to yield siloxane groupings (crosslinking reaction and adhesion promotion function). Examples of catalysts, which can be used alone or in combination, include: titanates, such as tetrabutyl titanate and tetrapropyl titanate; tin carboxylates such as dibutyltin dilaurate (DBTL), dibutyltin diacetate, dibutyltin diethylhexanoate, dibutyltin dioctoate, dibutyltin dimethylmaleate, dibutyltin diethylmaleate, dibutyltin dibutylmaleate, dibutyltin diisooctylmaleate, dibutyltin ditridecylmaleate, dibutyltin dibenzylmaleate, dibutyltin maleate, dibutyltin diacetate, tin octaoate, dioctyltin distearate, dioctyltin dilaurate (DOTL), dioctyltin diethylmaleate, dioctyltin diisooctylmaleate, dioctyltin diacetate, and tin naphthenoate; tin alkoxides such as dibutyltin dimethoxide, dibutyltin diphenoxide, and dibutyltin diisoproxide; tin oxides, such as dibutyltin oxide and dioctyltin oxide; reaction products between dibutyltin oxides and phthalic acid esters; dibutyltin bisacetylacetonate; organoaluminum compounds, such as aluminum trisacetylacetonate, aluminum trisethylacetoacetate, and diisopropoxyaluminum ethylacetoacetate; chelate compounds, such as zirconium tetraacetylacetonate and titanium tetraacetylacetonate; lead octanoate; amine compounds or salts thereof with carboxylic acids, such as butylamine, octylamine, laurylamine, dibutylamines, monoethanolamines, diethanolamines, triethanolamine, diethylenetriamine, triethylenetetramine, oleylamines, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methylmorpholine, 2-ethyl-4-methylimidazole and 1,8-diazabicyclo-(5,4,0)-undecene-7 (DBU); a low-molecular-weight polyamide resin obtained from an excess of a polyamine and a polybasic acid; adducts of a polyamine in excess with an epoxy; and, silane adhesion promoters having amino groups, such as 3-aminopropyltrimethoxysilane and N-(β-aminoethyl)aminopropylmethyldimethoxysilane.

As noted, the curable compositions according to the present invention can additionally contain fillers. Suitable here are, for example, chalk, lime powder, precipitated and/or pyrogenic silicic acid, zeolites, bentonites, magnesium carbonate, diatomite, alumina, clay, talc, titanium oxide, iron oxide, zinc oxide, sand, quartz, flint, mica, glass powder, and other ground mineral substances. Organic fillers can also be used, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers can also be added. Aluminum powder is likewise suitable as a filler.

The pyrogenic and/or precipitated silicic acids advantageously have a BET surface area from 10 to 90 $m^2/g$. When they are used, they do not cause any additional increase in the viscosity of the composition according to the present invention, but do contribute to strengthening the cured composition.

It is likewise conceivable to use pyrogenic and/or precipitated silicic acids having a higher BET surface area, advantageously from 100 to 250 $m^2/g$, in particular from 110 to 170 $m^2/g$, as a filler: because of the greater BET surface area, the effect of strengthening the cured composition is achieved with a smaller proportion by weight of silicic acid.

Also suitable as fillers are hollow spheres having a mineral shell or a plastic shell. These can be, for example, hollow glass spheres that are obtainable commercially under the trade names Glass Bubbles®. Plastic-based hollow spheres, such as Expancel® or Dualite®, may be used and are described in EP 0 520 426 B1: they are made up of inorganic or organic substances and each have a diameter of 1 mm or less, preferably 500 μm or less.

Fillers which impart thixotropy to the composition may be preferred for many applications: such fillers are also described as rheological adjuvants, e.g. hydrogenated castor oil, fatty acid amides, or swellable plastics such as PVC.

The total amount of fillers present in the compositions of the present invention will preferably be from 1 to 80 wt. %, and more preferably from 5 to 60 wt. %, based on the total weight of the composition. The desired viscosity of the curable composition will typically be determinative of the total amount of filler added and it is submitted that in order to be readily extrudable out of a suitable dispensing apparatus—such as a tube—the curable compositions should possess a viscosity of from 3000 to 150,000, preferably from 40,000 to 80,000 mPas, or even from 50,000 to 60,000 mPas.

Examples of suitable pigments are titanium dioxide, iron oxides, or carbon black.

In order to enhance shelf life even further, it is often advisable to further stabilize the compositions of the present invention with respect to moisture penetration through using drying agents. A need also occasionally exists to lower the viscosity of an adhesive or sealant composition according to the present invention for specific applications, by using reactive diluent(s). The total amount of reactive diluents present will typically be up to 15 wt. %, and preferably from 1 and 5 wt. %, based on the total weight of the composition.

All compounds that are miscible with the adhesive or sealant with a reduction in viscosity, and that possess at least one group that is reactive with the polymeric binder, can be used as reactive diluents. The following substances can be used, for example, as reactive diluents: polyalkylene glycols reacted with isocyanatosilanes (e.g. Synalox 100-50B, Dow); carbamatopropyltrimethoxysilane; alkyltrimethoxysilane, alkyltriethoxysilane, methyltrimethoxysilane, methyltriethoxysilane, and vinyltrimethoxysilane (VTMO Geniosil XL 10, Wacker), vinyltriethoxysilane, phenyltrimethoxysilane, phenyltriethoxysilane, octyltrimethoxysilane, tetraethoxysilane, vinyldimethoxymethylsilane (XL12, Wacker), vinyltriethoxysilane (GF56, Wacker), vinyltriacetoxysilane (GF62, Wacker), isooctyltrimethoxysilane (IO Trimethoxy), isooctyltriethoxysilane (IO Triethoxy, Wacker), N-trimethoxysilylmethyl-O-methyl carbamate (XL63, Wacker), N-dimethoxy(methyl)silylmethyl-O-methyl carbamate (XL65, Wacker), hexadecyltrimethoxysilane, 3-octanoylthio-1-propyltriethoxysilane, and partial hydrolysates of the aforementioned compounds.

Also usable as reactive diluents are the following polymers of Kaneka Corp.: MS S203H, MS S303H, MS SAT 010, and MS SAX 350. Silane-modified polymers that are derived, for example, from the reaction of isocyanatosilane with Synalox (Dow) grades can likewise be used.

In the same manner, the silylated or end-capped polymers according to the present invention can be used in a mixture with usual polymers or pre-polymers known per se, optionally with concurrent use of the aforementioned reactive diluents, fillers, and further adjuvants and additives. "Usual polymers or pre-polymers" can be selected in this context from polyesters, polyoxyalkylenes, polyacrylates, polymethacrylates, or mixtures thereof; these can be free of groups reactive with siloxane groups, but optionally can also comprise alkoxysilyl groups or hydroxyl groups.

A plurality of the aforementioned silane-functional reactive diluents have at the same time a drying and/or adhesion-promoting effect in the composition. Also suitable as adhesion promoters, however, are so-called tackifying agents of which examples include: hydrocarbon resins; phenol resins; terpene-phenolic resins; resorcinol resins or derivatives thereof; modified or unmodified rosin acids or rosin esters (abietic acid derivatives); polyamines; polyaminoamides; anhydrides; and, anhydride-containing copolymers. The addition of polyepoxide resins in small quantities can also improve adhesion on many substrates: solid epoxy resins having a molecular weight of over 700, provided in finely ground form, are then preferably used for this. If tackifying agents are used as adhesion promoters, their nature and quantity depend on the adhesive/sealant composition and on the substrate onto which it is applied. Typical tackifying resins (tackifiers) such as, for example, terpene-phenolic resins or resin acid derivatives, may be used in concentrations of from 5 to 20 wt. %; typical adhesion promoters, such as polyamines, polyaminoamides, phenolic resins or resorcinol derivatives may be used in the range from 0.1 to 10 wt. %, based on the total weight of the composition.

Various features and embodiments of the disclosure are described in the following examples, which are intended to be representative and not limiting.

EXAMPLES

Synthesis Example 1: Synthesis of 2-Hydroxy-Propylallylether

Allylic alcohol and propylene oxide were reacted in a ratio of 1.5 to 1. To this end, 1.463 g of sodium were dissolved in 184 g of the alcohol while externally cooling the stirred mixture with ice. The obtained solution was placed in an autoclave, heated to 110° C. and propylene oxide was added at a rate of 1.25 g/min. After complete addition the mixture was allowed to cool to room temperature and stirred overnight. 37% hydrochloric acid was added (6.25 g) to the resultant mixture and stirred for 10 minutes. The raw product was then filtered through Silica/Diatomite. The filtrate was collected and dried over $Na_2SO_4$ and then filtered again. To obtain the desired product, the mixture was distilled over a packed body column and the product collected at a temperature between 82 and 92° C. and a pressure of from 96 to 105 mbar. The average yield of 2-hydroxy-propylallylether was 60%. The compound contains trace amounts of 2-(allyloxy)propan-1-ol.

Synthesis Example 2: Synthesis of 1,3-(2'-Hydroxypropoxypropyl)-1,1,3,3-tetramethyldisiloxane 80.6 g of 1,1,3,3-tetramethyldisiloxane were dissolved in 600 mL of dry toluene, externally cooled with crushed ice to 10° C. and 400 mg of 5 wt % platinum on carbon was added. 2-Hydroxy-propylallylether (139.4 g)—as obtained from Synthesis Example 1—was added dropwise over a period of 30 minutes. The temperature of the reaction mixture was raised to 100° C. over a period of 5 hours and held at this temperature for a further 12 hours. The resultant mixture was finally refluxed for two hours. Then 250 mL of heptane and active charcoal were added and the mixture again warmed to reflux for 1.5 hours. After cooling the solution was filtered through Silica/Diatomite and the solvent was stripped off under reduced pressure; the product was finally held at 50 mbar pressure and 90° C. for 12 hours to obtain 181.6 g of the desired product.

Example 1: Synthesis of Polymer 1

800 g of octamethycylcotetrasiloxane ($D_4$), 1.51 g of 1,1,3,3-tetramethyl-disiloxane and 400 µl of triflic acid were placed in a 2 litre reactor (SYSTAG FlexyPAT) equipped with an anchor agitator and heated at 90° C. for 2 hours under stirring. The mixture was quenched with 12.8 g of $NaHCO_3$ and stirred for 30 minutes at 90° C. At 3 bar pressure, the crude product was filtered through a PALL Filter EDF 14-2 with a filter insert Begerow BECO KD5. The residual $D_4$ was removed in a thin film evaporator at 120° C. and 2 mbar (200 rpm/200 g/h). The polymer obtained was analyzed by GPC analysis and found to have: a number average molecular weight (Mn) of 82413 g/mol; a weight average molecular weight (Mw) of 125264 gmol-1; a peak molecular weight (Mp) of 121511 gmol-1; and, a Polydispersity Index of 1.52.

Example 2: Synthesis of Polymer 2

800 g of octamethycylcotetrasiloxane ($D_4$), 5.14 g of 1,3-(2'-Hydroxypropoxypropyl)-1,1,3,3-tetramethyl-disiloxane, as obtained from Synthesis Example 2 above, and 400 μl of triflic acid were placed in a 2 litre reactor (SYSTAG FlexyPAT) equipped with an anchor agitator and heated at 90° C. for 2 hours under stirring. The mixture was quenched with 12.8 g of $NaHCO_3$ and stirred for 30 minutes at 90° C. At 3 bar pressure, the crude product was filtered through a PALL Filter EDF 14-2 with a filter insert Begerow BECO KD5. The residual D4 was removed in a thin film evaporator at 120° C. and 2 mbar (200 rpm/200 g/h). The polymer obtained was analyzed by GPC analysis and found to have: a number average molecular weight (Mn) of 72932 g/mol; a weight average molecular weight (Mw) of 115717 gmol-1; a peak molecular weight (Mp) of 116142 gmol-1; and, a Polydispersity Index of 1.59.

Example 3: Synthesis of Polymer 3

500 g of the Si—H terminated Polymer 1 were dissolved in 600 g of dry toluene and placed in 2 litre reactor (SYSTAG FlexyPAT) equipped with an anchor agitator. 0.11 g of 5 wt % Platinum on silica were added and the temperature of the reaction mixture was raised to 40° C. and maintained there for 1 hour before it was raised again to 80° C. and held for an additional 17 hours. Finally, the mixture was refluxed at 120° C. for 2 hours before it was allowed to cool down to room temperature. After cooling, the solution was filtered through a PALL Filter Typ EDF 14-2 with filter insert Begerow BECO KD5 at 3 bar pressure and the solvent was stripped off in a thin film evaporator at 80° C. and 100 mbar. The polymer was analyzed by GPC analysis and found to have: a number average molecular weight (Mn) of 81218 gmol-1; a weight average molecular weight (Mw) of 125078 gmol-1; a peak molecular weight (Mp) of 122191 gmol-1; and, a Polydispersity of 1.54.

Example 4: Synthesis of Polymer 4

487 g of Polymer 2 were dried in a 500 ml three-neck flask at 80° C. under vacuum. Under a nitrogen atmosphere at 80° C., 0.15 g of dibutyltin dilaurate was added followed by 3.1 g 3-isocyanatopropyltrimethoxysilane (% NCO=19.75). After stirring for two hours at 80° C., the resulting polymer was cooled. After adding 9.75 g Geniosil® XL 10 (vinyltrimethoxysilane, available from Wacker Chemie) to the reactor while stirring and homogenizing for 10-30 minutes at 80° C., the resulting polymer was stored in a moisture-proof glass vessel under a nitrogen atmosphere before being processed further into a curable composition.

Example 5: Synthesis of Polymer 5

371 g of Polymer 3 were dried in a 500 ml three-neck flask at 80° C. under vacuum. Under a nitrogen atmosphere at 80° C., 0.11 g of dibutyltin dilaurate was added followed by 1.69 g 3-isocyanatopropyltrimethoxysilane (% NCO=19.75). After stirring for two hours at 80° C., the resulting polymer was cooled. After adding 7.41 g Geniosil® XL 10 to the reactor while stirring and homogenizing for 10-30 minutes at 80° C., the resulting polymer was stored in a moisture-proof glass vessel under a nitrogen atmosphere before being processed further into a curable composition.

Example 6: Formulations

Polymer 4 as described above was used to prepare Formulation A. Analogously, Polymer 5 was employed to prepare Formulation B. These two formulations are described in Table 1 herein below.

TABLE 1

| Raw material | Formulation A (Parts by Weight) | Formulation B - Comparative (Parts by Weight) |
|---|---|---|
| Polymer 4 | 39.25 | |
| Polymer 5 | | 39.25 |
| Polydimethylsiloxane plasticiser | 11.32 | 11.32 |
| Polyether Polyol as a rheology modifier | 0.31 | 0.31 |
| Chalk (calcium carbonate) | 41.30 | 41.30 |
| Highly dispersed silicic acid specific surface area 150 | 5.00 | 5.00 |
| Vinyltrimethoxysilane | 1.34 | 1.34 |
| Catalyst $(nBu)_4Ti$ | 1.48 | 1.48 |

Adhesion and Mechanical Tests were performed on said formulations.

6.1 Measurement of Skin Over Time

The determination of the skin overtime is carried out under standard climate conditions (23+/−2° C., relative humidity 50+/−5%). The temperature of the formulation must be 23+/−2° C., with the sealant stored for at least 24 hour beforehand in the laboratory. The formulation is applied to a sheet of paper and spread out with a putty knife to form a skin (thickness approximately 2 mm, width approximately 7 cm). A stopwatch is started immediately. At intervals, the surface is touched lightly with the fingertip and the finger is pulled away, with sufficient pressure on the surface that an impression remains on the surface when the skin over time is reached. The skin over time is reached when sealing compound no longer adheres to the fingertip. The skin over time is expressed in minutes.

6.2 Measurement of Shore A Hardness

The procedure is carried out in accordance with ISO 868.

6.3 Measurement of Mechanical Properties (Tensile Test)

The breaking strength, elongation at break, and tensile stress values (modulus of elasticity) are determined by the tensile test in accordance with DIN 53504.

Deviation from the norm: Dumbbell test specimens having the following dimensions are used as test pieces: thickness: 2+/−0.2 mm; width of web: 10+/−0.5 mm; length of web: approximately 45 mm; total length: 9 cm. The test is carried out under standard climate conditions (23+/−2° C., 50+/−5% relative humidity). The test is conducted after curing for 7 days.

Procedure: A film of the sealing compound 2 mm thick is spread out. The film is stored for 7 days under standard climate conditions, and the dumbbell test specimens are then punched out. Three dumbbell test specimens are produced for each determination. The test is carried out under standard climate conditions. The test pieces must be acclimatized (i.e. stored) beforehand for at least 20 minutes at the test temperature. Prior to the measurement, the thickness of the test pieces is measured at room temperature with a slide gauge at ≥least 3 locations; for the starting measurement length, preferably the ends and center of the dumbbell test specimens are measured. For elastic materials, it is recommended to take an additional measurement crosswise over the web. The average value is entered into the measurement program. The test pieces are clamped into the tensile testing machine in such a way that the longitudinal axis coincides with the mechanical axis of the tensile testing machine, and the largest possible surface area of the heads of the dumbbell test specimens is included without the web becoming jammed. The dumbbell test specimen is stretched to a pre-tensioning of <0.1 MPa at a feed rate of 50 mm/min. The curve of the change in force versus length is recorded at a feed rate of 50 mm/min.

Evaluation: The following values are taken from the measurement: breaking strength [N/mm$^2$]; elongation at break [%]; and, modulus of elasticity at 100% elongation [N/mm$^2$].

Alternatively, the specimens can also be immersed in a medium such as base/acid or oil, for an additional 7 days in order to test the chemical resistance of the formulation.
The results of the measurements are shown in Table 2 herein below.

TABLE 2

Results of the Mechanical Tests

| | Formulation A | Formulation B (Comparative) |
|---|---|---|
| Skin over time (SOT) (minutes) | 7 | 10 |
| Shore A hardness after 7 days | 23 | 8.5 |
| Elongation at break after 7 days at 23° C., 50% RH (%) | | >950% |
| Modulus of elasticity 100% after 7 days at 23° C., 50% RH (N/mm$^2$) | 0.24 | 0.1 |
| Modulus at break after 7 days at 23° C., 50% RH (N/mm$^2$) | 0.87 | 0.38 |
| Elongation at break after 7 days at 23° C., 50% RH + 7 days 10% NaOH (%) | | >600% |
| Modulus of elasticity 100% after 7 days at 23° C., 50% RH + 7 days 10% NaOH (N/mm$^2$) | 0.26 | 0.09 |
| Modulus at break after 7 days at 23° C. 50% RH + 7 days 10% NaOH (N/mm$^2$) | 0.71 | 0.28 |
| Elongation at break after 7 days at 23° C. 50% RH + 7 days 3% HCl (%) | | >900% |
| Modulus of elasticity 100% after 7 days at 23° C., 50% RH + 7 days 3% HCl (N/mm$^2$) | 0.26 | 0.1 |
| Modulus at break after 7 days at 23° C. 50% RH + 7 d 3% HCl (N/mm$^2$) | 1.05 | 0.38 |
| Elongation at break after 7 days at 23° C., 50% RH + 7 days 0W40 (%) | | >900% |
| Modulus of elasticity 100% after 7 days at 23° C., 50% RH + 7 days 0W40 (N/mm$^2$) | 0.22 | 0.1 |
| Modulus at break after 7 days at 23° C., 50% RH + 7 days 0W40 (N/mm$^2$) | 0.86 | 0.32 |
| Elongation at break after 7 days at 23° C., 50% RH + 7 days BOT355 (%) | | >800% |
| Modulus of elasticity 100% after 7 days at 23° C., 50% RH + 7 days BOT355 (N/mm$^2$) | 0.19 | 0.09 |
| Modulus at break after 7 days at 23° C., 50% RH + 7 days BOT355 (N/mm$^2$) | 0.6 | 0.3 |
| Elongation at break after 7 days At 23° C., 50% RH + 7 days UV ARRAY (%) | | >450% |
| Modulus of elasticity 100% after 7 days at 23° C., 50% RH + 7 days UV ARRAY (N/mm$^2$) | 0.15 | 0.1 |
| Modulus at break after 7 days at 23° C., 50% RH + 7 days UV ARRAY (N/mm$^2$) | 0.46 | 0.21 |

From the tests above, it can be clearly seen that Formulation B has not completely cured through: this is clear, in particular, from the SOT and Shore A hardness and from the observation that every modulus measured for Formulation B is at least half the measured value for Formulation A. It is considered that the hydrosilylation of the long chain Polymer 1 cannot be done effectively with the current techniques.

In view of the foregoing description and examples, it will be apparent to those skilled in the art that equivalent modifications thereof can be made without departing from the scope of the claims.

The invention claimed is:

1. A method for producing a hydroxyl-functionalized polysiloxane having secondary or tertiary hydroxyl groups, said method comprising the following steps in the following order:

i) providing a hydroxyalkyl alkenyl ether having a secondary or tertiary alcohol group, the hydroxylalkyl alkenyl ether conforming to Formula (I)

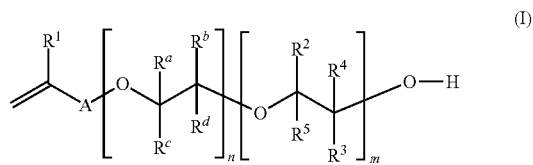

wherein n is 0, 1, 2, 3, 4 or 5; m is 1, 2, 3, 4 or 5; A is a covalent bond or a $C_1$-$C_{12}$ alkylene group; $R^1$ is selected from hydrogen, and a $C_1$-$C_6$ alkyl group; $R^a$, $R^b$, $R^c$, $R^d$, may be the same or different and each is independently selected from hydrogen, a $C_1$-$C_8$ alkyl group, a $C_6$-$C_{18}$ aryl group or a $C_6$-$C_{18}$ aralkyl group, $R^2$, $R^3$ and $R^5$ are hydrogen; and $R^4$ is a phenyl group;

ii) providing a siloxane conforming to Formula (II)

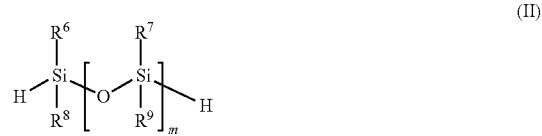

wherein m is 1, 2, 3, 4 or 5; $R^6$, $R^7$, $R^8$ and $R^9$ may be the same or different and each is independently selected from a $C_1$-$C_8$ alkyl group, a $C_3$-$C_{10}$ cycloalkyl group, a $C_6$-$C_{18}$ aryl group or a $C_6$-$C_{18}$ aralkyl group;

iii) reacting the hydroxyalkyl alkenyl ether having a secondary or tertiary alcohol group with the siloxane under anhydrous conditions and in the presence of a transition metal catalyst of which the transition metal is selected from Groups 8 to 10 of the Periodic Table to form a reaction product; and iv) in the presence of the purified product, performing a ring opening polymerization of at least one cyclic siloxane monomer having the general Formula (III)

wherein n is 3, 4, 5, 6, 7 or 8; $R^{10}$ and $R^{11}$ may the same or different and each is independently selected from hydrogen, a $C_1$-$C_8$ alkyl group, a $C_2$-$C_8$ alkenyl group, a $C_3$-$C_{10}$ cycloalkyl group, a $C_6$-$C_{18}$ aryl group or a $C_6$-$C_{18}$ aralkyl group.

2. The method according to claim 1, wherein in Formula (I):

A is a covalent bond.

3. The method according to claim 1, wherein in Formula (II) each of $R^6$, $R^7$, $R^8$ and $R^9$ represents a $C_1$-$C_4$ alkyl group or a $C_5$-$C_6$ cycloalkyl group.

4. The method according to claim 1, wherein the transition metal catalyst comprises at least one metal selected from the group consisting of ruthenium, rhodium, palladium, osmium, iridium and platinum and further comprises a powdered support selected from the group consisting of alumina, silica and carbon.

5. The method according to claim 1, wherein in Formula (III) each of $R^{10}$ and $R^{11}$ independently represents a $C_1$-$C_8$ alkyl group.

6. The method according to claim 1, wherein the ring opening polymerization of step iv) is performed under acid catalysis and wherein said acid catalyst comprises one or more acids selected from the group consisting of: HCl; HBr; HI; $H_2SO_4$; $HClO_4$; para-toluenesulfonic acid; trifluoroacetic acid; perfluoroalkane sulfonic acids and combinations thereof.

7. A hydroxyl-functionalized polysiloxane obtained by the process according to claim 1.

8. The hydroxyl-functionalized polysiloxane obtained by the process according to claim 1 and having at least one of:
a number average molecular weight (Mn) of from 5,000 to 100,000 g/mol; and
a polydispersity index in the range from 1.0 to 2.5.

9. A composition comprising the hydroxyl-functionalized polysiloxane obtained by the process according to claim 1; and at least one compound having at least one hydroxyl group-reactive functionality.

10. A curable composition comprising the hydroxyl-functionalized polysiloxane according to claim 7 as a reactive component and further comprising at least one compound having at least one hydroxyl group-reactive functionality.

11. A silylated polymer that is the reaction product of a mixture comprising:
a hydroxyl-functionalized polysiloxane having secondary or tertiary hydroxyl groups, that is the reaction product of a method comprising the steps of:
i) providing a hydroxyalkyl alkenyl ether having a secondary or tertiary alcohol group, the hydroxylalkyl alkenyl ether conforming to Formula (I)

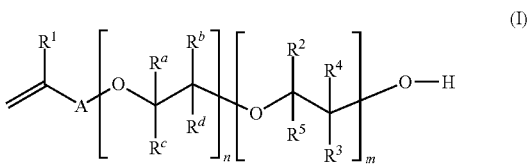

wherein n is 0, 1, 2, 3, 4 or 5; m is 1, 2, 3, 4 or 5; A denotes a spacer group which is constituted by a covalent bond or a $C_1$-$C_{20}$ alkylene group; $R^1$ is selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group; $R^a$, $R^b$, $R^c$, $R^d$, $R^2$, $R^3$, $R^4$ and $R^5$ may be the same or different and each is independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen;

ii) providing a siloxane conforming to Formula (II)

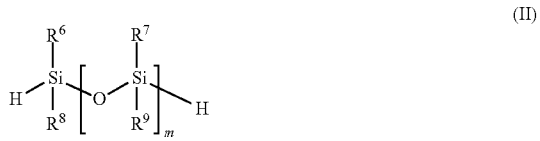

wherein m is 1, 2, 3, 4 or 5; $R^6$, $R^7$, $R^8$ and $R^9$ may be the same or different and each is independently selected from a $C_1$-$C_8$ alkyl group, a $C_3$-$C_{10}$ cycloalkyl group, a $C_6$-$C_{18}$ aryl group or a $C_6$-$C_{18}$ aralkyl group;

iii) reacting the hydroxyalkyl alkenyl ether having a secondary or tertiary alcohol group with the siloxane under anhydrous conditions and in the presence of a transition metal catalyst of which the transition metal is selected from Groups 8 to 10 of the Periodic Table to provide a reaction product; and iv) in the presence of the reaction product of step iii), performing a ring opening polymerization of at least one cyclic siloxane monomer having the general Formula (III)

wherein n is 3, 4, 5, 6, 7 or 8; $R^{10}$ and $R^{11}$ may the same or different and each is independently selected from hydrogen, a $C_1$-$C_8$ alkyl group, a $C_2$-$C_8$ alkenyl group, a $C_3$-$C_{10}$ cycloalkyl group, a $C_6$-$C_{18}$ aryl group or a $C_6$-$C_{18}$ aralkyl group; and at least one isocyanatosilane of Formula (VI):

OCN—B—Si—$(X)_m(R^{12})_{3-m}$     (VI)

wherein: m is 0, 1 or 2;
each $R^{12}$ is independently selected from a hydroxyl group, a $C_1$-$C_{10}$ alkoxy group, a $C_1$-$C_{10}$ acyloxy group, or —OCH($R^{13}$)COOR$^{14}$, wherein $R^{13}$ is selected from hydrogen or a $C_1$-$C_4$ alkyl group; and $R^{14}$ is selected from a $C_1$-$C_8$ alkyl group;
each X is independently selected from a $C_1$-$C_8$ alkyl group which can optionally be interrupted by at least one heteroatom; and
B is selected from a $C_1$-$C_{20}$ alkylene group.

12. A silylated polymer that is the reaction product of:
an NCO-terminated prepolymer that is the reaction product of a hydroxyl-functionalized polysiloxane having secondary or tertiary hydroxyl groups, that is the reaction product of a method comprising the steps of:
i) providing a hydroxyalkyl alkenyl ether having a secondary or tertiary alcohol group, the hydroxylalkyl alkenyl ether conforming to Formula (I)

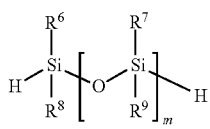

(II)

wherein n is 0, 1, 2, 3, 4 or 5; m is 1, 2, 3, 4 or 5; A denotes a spacer group which is constituted by a covalent bond or a $C_1$-$C_{20}$ alkylene group; $R^1$ is selected from hydrogen, a $C_1$-$C_8$ alkyl group, a $C_3$-$C_{10}$ cycloalkyl group, a $C_6$-$C_{18}$ aryl group or a $C_6$-$C_{18}$ aralkyl group; $R^a$, $R^b$, $R^c$, $R^d$, $R^2$, $R^3$, $R^4$ and $R^5$ may be the same or different and each is independently selected from hydrogen, a $C_1$-$C_8$ alkyl group, a $C_6$-$C_{18}$ aryl group or a $C_6$-$C_{18}$ aralkyl group, with the proviso that at least one of $R^3$ and $R^4$ is not hydrogen;

ii) providing a siloxane conforming to Formula (II)

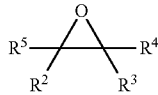

(V)

wherein m is 1, 2, 3, 4 or 5; $R^6$, $R^7$, $R^8$ and $R^9$ may be the same or different and each is independently selected from a $C_1$-$C_8$ alkyl group, a $C_3$-$C_{10}$ cycloalkyl group, a $C_6$-$C_{18}$ aryl group or a $C_6$-$C_{18}$ aralkyl group;

iii) reacting the hydroxyalkyl alkenyl ether having a secondary or tertiary alcohol group with the siloxane under anhydrous conditions and in the presence of a transition metal catalyst of which the transition metal is selected from Groups 8 to 10 of the Periodic Table to provide a reaction product; and iv) in the presence of the reaction product of step iii), performing a ring opening polymerization of at least one cyclic siloxane monomer having the general Formula (III)

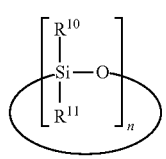

(III)

wherein n is 3, 4, 5, 6, 7 or 8; $R^{10}$ and $R^{11}$ may the same or different and each is independently selected from hydrogen, a $C_1$-$C_8$ alkyl group, a $C_2$-$C_8$ alkenyl group, a $C_3$-$C_{10}$ cycloalkyl group, a $C_6$-$C_{18}$ aryl group or a $C_6$-$C_{18}$ aralkyl group;

with at least one polyisocyanate, wherein there is a stoichiometric excess of the NCO groups of the polyisocyanate with respect to the OH groups of the hydroxyl-functionalized polysiloxane; and at least one silane having at least one NCO group-reactive functionality.

13. A curable composition comprising the silylated polymer as defined in claim 12.

* * * * *

UNITED STATES PATENT AND TRADEMARK OFFICE
CERTIFICATE OF CORRECTION

PATENT NO. : 11,326,027 B2
APPLICATION NO. : 16/441451
DATED : May 10, 2022
INVENTOR(S) : Marleen Winterberg et al.

It is certified that error appears in the above-identified patent and that said Letters Patent is hereby corrected as shown below:

In the Specification

Column 15, Line 5-6 change "3-isocyanatopropyld imethylmethoxysilane" to --3-isocyanatopropyldimethylmethoxysilane--.

Signed and Sealed this
Twentieth Day of December, 2022

Katherine Kelly Vidal
*Director of the United States Patent and Trademark Office*